March 8, 1960  P. GOODMAN  2,927,496
LATERALLY ADJUSTABLE BOLTS
Filed Aug. 9, 1957
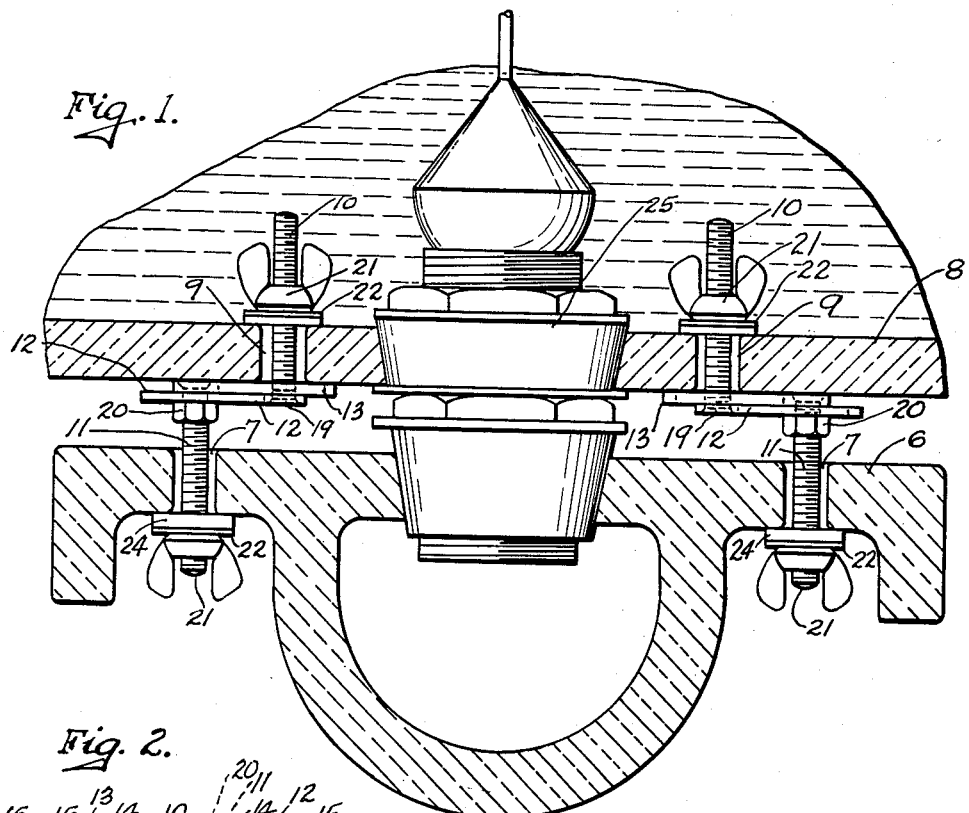
INVENTOR
Paul Goodman.
BY
Alfred R. Fuchs
ATTORNEY

United States Patent Office 2,927,496
Patented Mar. 8, 1960

2,927,496

LATERALLY ADJUSTABLE BOLTS

Paul Goodman, Kansas City, Mo.

Application August 9, 1957, Serial No. 677,255

2 Claims. (Cl. 85—1)

My invention relates to fastening devices, and more particularly to an adjustable connecter for the flush tank and bowl of a toilet.

It becomes frequently necessary to replace either the flush tank or the bowl of a close coupled bowl and flush tank combination, and it is also frequently the case that when one or the other of these elements of the toilet combination are replaced the holes for the fastening elements in one of these devices do not line up with the holes for the fastening elements in the other device constituting this combination. It is the purpose of the present invention to provide means for fastening a flush tank and toilet bowl together, that is of such a character that it can be adjusted to secure such a flush tank to a bowl even though the holes for the fastening elements are out of alignment with each other.

More particularly my invention consists of a fastening device comprising a pair of threaded bolt-line stems and means connecting said stems in such a manner that the longitudinal axes of said stems will be arranged in parallelism to each other, but out of alignment and extending in opposite directions from the means that connect said stems together, the connecting means being adjustable to vary the spacing of the axes of the threaded stems so that these stems can be inserted through holes that are out of alignment with each other for securement of the two parts together that have holes for fastening elements therein that do not align.

More specifically my invention comprises a pair of fastening members, each of which has a flat elongated plate-like member and a screw-threaded shank or stem extending from one end thereof, preferably, in fixed position, said stem extending perpendicularly to the plate-like member, said plate-like members being secured together in overlapping position, the amount of overlap being adjustable, and said fastening device comprising means for clamping the two plate-like members in adjusted overlapped position.

The means for adjusting the plate-like members relative to each other to adjust the amount of overlap thereof comprises slots that are provided in each of said plate-like members that align with each other, the stem portion of one of said fastening members being adapted to be passed through the slot in the other fastening member, and one of said threaded members having a nut or similar clamping means thereon engaging the other plate-like member so as to clamp said plate-like members in relatively adjusted position. The plate-like member and screw-threaded stem or shank may be secured together in fixed position by providing a shoulder on the screw-threaded member against which the plate-like member is fastened, by heading over the material of the stem by a riveting or similar operation, or the screw-threaded stem and the plate-like member can be formed integrally.

Other objects and advantages of my invention will appear as the description of the drawings proceeds. I desire to have it understood, however, that I do not intend to limit myself to the particular details shown or described, except as defined by the claims.

In the drawings:

Fig. 1 is a fragmentary sectional view through a portion of a flush tank and a toilet bowl, showing my improved adjustable connecting means in position for securing the bowl and tank together.

Fig. 2 is an end elevation of my improved fastening device, the means for securing said fastening device to the bowl and tank being omitted.

Fig. 3 is a section through my improved fastening device, taken on the line 3—3 of Fig. 2, partly broken away and showing the compressible gasket members, washers and wing nuts used in connection therewith in position on the threaded stems.

Fig. 4 is a section taken on the line 4—4 of Fig. 3, and

Fig. 5 is a view partly in longitudinal section and partly in elevation of a modification.

Referring in detail to the drawings, in Fig. 1 is shown a portion of a toilet bowl 6, which is provided with a pair of openings 7 therein for receiving fastening elements therethrough, and a portion of a flush tank having a bottom wall 8 provided with openings 9 for receiving fastening elements therethrough, the openings 9 being out of alignment with the openings 7 because of the openings 7 being more widely spaced than the openings 9. While the openings 9 are shown as being more closely spaced than the openings 7, the reverse is also sometimes true, that the openings 9 in the bottom of the flush tank are more widely spaced than the openings 7 in the toilet bowl 6. My invention is applicable to either situation and is of such a character that it is capable of securing a flush tank and toilet bowl together for all variations in spacing of the openings in the bowl and tank that are encountered in practice.

My improved fastening device comprises a pair of substantially duplicate fastening members, each of which comprises a threaded stem portion and a plate-like member fixed in position on said threaded stem portion. While the two fastening members are substantial duplicates, the stem portions of each of said members is referred to by a different reference numeral, as is also true of the plate-like members thereof, in order to facilitate the description of the construction and operation of the device. Each fastening device comprises a threaded stem or shank portion 10 and a threaded shank or stem portion 11. Secured to the threaded stem or shank portion 10 is a plate-like member 12 and secured to the threaded shank portion 11 is a plate-like member 13. Said plate-like members are of an elongated character, as will be evident from Fig. 2, and are adapted to engage each other face to face as shown in Fig. 3. Each of said plate-like members has parallel sides 14 and rounded ends 15 and each is provided with a longitudinally extending slot 16, the slots 16 of the members 12 and 13 being the same in width and length and being in longitudinal alignment with each other, as is evident from Fig. 2. One end of each of said slots is nearer to the rounded end of the plate-like member in which it is provided than the other end thereof, leaving an end portion in each of said plate-like members that is adapted to have the stem associated therewith attached thereto.

In the form of the invention shown in Fig. 3 the stems 10 and 11 are secured to the plate-like members 12 and 13 by providing a reduced end portion 17 on the threaded shank portion, which provides a shoulder 18 thereon that is adapted to engage with the one face of the plate-like member with which the threaded stem is associated. The opening through which the reduced portion 17 extends in each of said plate-like members is countersunk and the material of the reduced portion 17 is headed, as shown at 19 in Fig. 3, to secure the stem 10 in fixed position on the plate-like member 12 adjacent one end thereof and to similarly secure the stem 11 on the plate-like member 13 at one end thereof.

Instead of providing screw-threaded stem or shank portions secured to the plate-like members in the manner shown in Fig. 3, the structure shown in Fig. 5 can be provided in which the plate-like member 12′ is provided with a screw-threaded shank 10′ integral therewith, said plate-like member 12′ being of the same shape and similarly slotted as shown at 16 as the plate-like member 12. Similarly, the plate-like member 13′ is provided with a threaded shank 11′ integral therewith and is similarly slotted at 16.

The plate-like members having the threaded stems projecting from adjacent one end thereof in fixed position and with the slotted portions thereof extending laterally from the threaded stems as shown in Figs. 1, 3 and 5, are assembled in the manner shown in Figs. 1, 3 and 5 so that the threaded stem 10 extends through the slot 16 in the plate-like member 13 and the threaded stem 11 extends through the slot 16 in the plate-like member 12. Thus, with the plate-like members 12 and 13 extending perpendicularly to the axes of the threaded stems 10 and 11 in opposite directions, these will be arranged in overlapping relation, as shown in Fig. 3, and are adapted to be in slidable face to face engagement. The plate-like members 12′ and 13′ and their threaded stems 10′ and 11′ are similarly assembled and related to each other.

Mounted on the threaded stem 11 is a nut 20, which is adapted to be tightened up against the face of the plate-like member 12 remote from the plate-like member 13 to clamp said plate-like members in adjusted overlapped position. Also, provided on the threaded stems 10 and 11 are the nuts 21, which are shown as being wing nuts, the metal washers 22 and compressible gasket members 23 and 24. The only difference between the compressible member 23 and the member 24 is that ordinarily the member 24 is made somewhat thicker than the member 23.

In the use of my improved fastening device the screw-threaded stems of shank portions 10 or 10′ are passed through the openings 9 in the bottom 8 of the flush tank and the threaded stems or shank portions 11 or 11′ are passed through the openings 7 in the bowl 6. The clamping nut 20 can be left in spaced position to the plate-like member 12 while the threaded members 10 and 11, or 10′ and 11′ are properly located in the openings 7 and 9. With the stem portions 10 and 11, or 10′ and 11′ in position in said openings, the nuts 20 are then tightened up and the plate-like members 12 and 13 thus clamped to each other in their adjusted overlapped position. Then the gasket 23 and its metal washer 22 are positioned adjacent the inside face of the bottom wall 8 of the tank and the wing nut 21 tightened down to provide a liquid tight joint at the opening 9. With the stems 11 or 11′ extending through the openings 7, the compressible gasket 24, the metal washer 22 and the wing nut 21 are then assembled with the threaded stem 11 or 11′, as the case may be, and the wing nut tightened down to clamp the threaded member 11 to the bowl and thus the flush tank to the bowl. The space between the bottom 8 of the flush tank and the top surface of the bowl 6, will vary with different types of flush valve connections between the tank and bowl. The particular spacing and the particular type of flush valve connection 25 shown is merely illustrative. Obviously, due to the flat character of the connecting means between the threaded stems 10 and 11, or 10′ and 11′, a very close coupling of the bottom of the tank 8 to the toilet bowl is possible.

What I claim is:

1. An angular screw-threaded headed fastening element adapted to secure together a pair of members having openings therein that are out of alignment comprising a thin flat body portion adjustable in length adapted to be mounted between said members and stems projecting from opposite sides of said body portion perpendicularly thereto, each of said stems being screw-threaded from adjacent said body portion to the end thereof remote from said body portion, said body portion comprising a pair of elongated flat slotted plates of much greater width than thickness mounted in longitudinally aligned face to face engagement, each of said stems being fixed at its end to one of said plates adjacent one end thereof to project from a flat face thereof and the slot in each of said plates extending longitudinally thereof from adjacent the stem fixed to said plate to adjacent the other end of said plate, each stem extending from the face of the plate fixed thereto that engages the face of the other plate and through the slot in the other plate and projecting for the major portion of its length beyond the remote face of said other plate with the longitudinal axes of said stems in parallelism and said plates extending in opposite directions from said stems in longitudinal alignment, a clamping nut engaging the threaded stem on one of said plates and adapted to engage the face of the other plate that is remote from the plate having said stem thereon to clamp said plates in overlapping adjusted face to face relation, whereby said stems are adapted to be spaced so that one of said stems will project through one of said openings and the other stem will project through the opening out of alignment therewith, and a clamping nut mounted on each of said stems in spaced relation to said flat body portion.

2. An angular screw-threaded fastening element adapted to secure together a pair of members having openings therein that are out of alignment comprising a thin flat body portion adjustable in length adapted to be mounted between said members and stems projecting from opposite sides of said body portion perpendicularly thereto, each of said stems being screw-threaded from adjacent said body portion to the end thereof remote from said body portion, said body portion comprising a pair of elongated flat slotted plate-like portions of much greater width than thickness mounted in longitudinally aligned face to face engagement, each of said stems being integrally united at its end with one of said plate-like portions adjacent one end thereof to project from a flat face thereof and the slot in each of said plate-like portions extending longitudinally thereof from adjacent the stem integral therewith to adjacent the other end of said plate-like portion, each stem extending from the face of the plate-like portion integral therewith that engages the face of the other plate-like portion and through the slot in the other plate-like portion and projecting for the major portion of its length beyond the remote face of said other plate-like portion with the longitudinal axes of said stems in parallelism and said plate-like portions extending in opposite directions from said stems in longitudinal alignment, a clamping nut engaging the stem on one of said plate-like portions and adapted to engage the face of the other plate-like portion that is remote from the plate-like portion having said stem thereon to clamp said plate-like portion in overlapping adjusted face to face relation, whereby said stems are adapted to be spaced so that one of said stems will project through one of said openings and the other stem will project through the opening out of alignment therewith, and a clamping nut mounted on each of said stems in spaced relation to said flat body portion.

References Cited in the file of this patent

UNITED STATES PATENTS

| | | |
|---|---|---|
| 844,143 | Kingsley | Feb. 12, 1907 |
| 868,501 | Stanley | Oct. 15, 1907 |
| 1,040,444 | Silverman | Oct. 8, 1912 |
| 2,142,388 | Wallace | Jan. 3, 1939 |
| 2,738,094 | Fowler | Mar. 13, 1956 |